(12) United States Patent
Ruellan et al.

(10) Patent No.: US 7,441,015 B2
(45) Date of Patent: Oct. 21, 2008

(54) METHOD OF UNDOING AN OPERATION REMOTELY EXECUTED ON A SERVER STATION

(75) Inventors: Hervé Ruellan, Rennes (FR); Jean-Jacques Moreau, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 589 days.

(21) Appl. No.: 10/051,022

(22) Filed: Jan. 22, 2002

(65) Prior Publication Data

US 2002/0138595 A1 Sep. 26, 2002

(30) Foreign Application Priority Data

Jan. 22, 2001 (FR) .................................. 01 00821

(51) Int. Cl.
*G06F 15/16* (2006.01)
*G06Q 30/00* (2006.01)
*G06Q 40/00* (2006.01)

(52) U.S. Cl. ..................... 709/219; 709/208; 705/26; 705/39; 705/40

(58) Field of Classification Search ............... 709/219, 709/208
See application file for complete search history.

(56) References Cited

U.S. PATENT DOCUMENTS

| | | | | |
|---|---|---|---|---|
| 5,453,601 A * | 9/1995 | Rosen | .......................... | 705/65 |
| 5,537,526 A | 7/1996 | Anderson et al. | ............ | 395/148 |
| 5,557,518 A | 9/1996 | Rosen | ......................... | 364/408 |
| 5,659,747 A | 8/1997 | Nakajima | ................... | 395/651 |
| 5,754,654 A * | 5/1998 | Hiroya et al. | .................. | 705/76 |
| 6,085,168 A | 7/2000 | Mori et al. | ..................... | 705/17 |
| 6,111,575 A | 8/2000 | Martinez et al. | ............. | 345/352 |
| 6,113,492 A * | 9/2000 | Walker et al. | .................. | 463/16 |
| 6,151,643 A * | 11/2000 | Cheng et al. | ................... | 710/36 |
| 6,192,378 B1 * | 2/2001 | Abrams et al. | .............. | 707/204 |
| 6,275,832 B1 * | 8/2001 | Watts et al. | .................. | 707/203 |
| 6,473,740 B2 * | 10/2002 | Cockrill et al. | ............... | 705/27 |

(Continued)

FOREIGN PATENT DOCUMENTS

EP 0 991 214 4/2000

(Continued)

OTHER PUBLICATIONS

Keith Schultz, An A-to-Z Web Server Suite—Microsoft has created a powerful package that offers everything-incluiding the kitchen sink, Dec. 16, 1996, CMP Publications, Inc.*

(Continued)

*Primary Examiner*—William C. Vaughn, Jr.
*Assistant Examiner*—Ranodhi N Serrao
(74) *Attorney, Agent, or Firm*—Fitzpatrick, Cella, Harper & Scinto

(57) ABSTRACT

Undoing a function requested by a first client station on a computer object stored on a server station of a communication network is provided. The execution of the function is adapted to manipulate the object from an earlier state to a manipulated state. The undoing is performed by receiving a request to undo the execution of the function. The earlier state of the manipulated object is obtained. Then, a response is sent to the first client station via the communication network, the response comprising a sum of money less than or equal to an execution cost associated with the function.

20 Claims, 10 Drawing Sheets

U.S. PATENT DOCUMENTS

| | | | |
|---|---|---|---|
| 6,648,906 B2 * | 11/2003 | Lasheras et al. | 607/105 |
| 6,771,981 B1 * | 8/2004 | Zalewski et al. | 455/557 |
| 2004/0027593 A1 * | 2/2004 | Wilkins | 358/1.2 |

FOREIGN PATENT DOCUMENTS

| | | |
|---|---|---|
| JP | 10-040462 | 2/1998 |
| JP | 11-003387 | 1/1999 |
| JP | 2000-115163 | 4/2000 |

OTHER PUBLICATIONS

A. Dan, et al., "An Object Implementation of Network Centric Business Service Applications (NCBSAs): Conversational Service Transactions, Service Monitor and an Application Style", Jeff Sutherland's Object Technology Website, Jan. 12, 1999. <URL:http://jeffsutherland.org/oops1a97/dan.html>, visited Dec. 4, 2001, pp. 1-17.

H. Kreger, "Web Services Conceptual Architecture (WSCA 1.0)", IBM Software Group, May 2001.

"PayWord and Micromint: Two simple micropayment schemes", Ronald L. Rivest and Adi Shamir, May 7, 1996, MIT Laboratory for Computer Science, available at http://theory.Ics.mit.edu/~rivest/RivestShamir-mpay.ps.

* cited by examiner

METHOD OF UNDOING AN OPERATION REMOTELY EXECUTED ON A SERVER STATION

BACKGROUND

1. Field of the Invention

The present invention relates to a method of undoing an operation remotely executed on a server station.

2. Description of Related Art

Currently an increasing number of computers operate in a network and use services supplied by other computers. Thus it is common on a communication network, for a client station, connected via the network to one or more server stations, to use the services of one of the server stations.

These services may for example be the remote execution of an operation or a function on a computer object stored on the server station. By way of example, the client station can use the services supplied by the server station in order to remotely manipulate an image.

These services can also be the supply of a document by the server station.

Generally on a communication network, these services supplied by the server stations are remunerated and invoiced to each client station.

Thus each operation is associated with an execution cost stored on the server station. On execution of each of these operations, they are invoiced to the client station on the fly, that is to say progressively with the execution of the operations.

SUMMARY OF THE INVENTION

The invention concerns more particularly the undoing of an operation remotely executed on a server station.

The undoing of such an operation undoes the effects of a remotely executed function.

In fact, it is not rare for a user to wish to return to an original state for an object being manipulated, for example after an inappropriate manipulation of the object.

It is also common for a user to proceed by successive steps to modify an object such as an image, and to regularly go back to eliminate certain undesirable effects.

The software Adobe Photoshop® is for example known, which processes a digital photograph and successively applies various digital filters in order to find the most suitable filter.

This possibility of going back and undoing an operation is unanimously approved and is generally incorporated in the majority of software packages on the market.

The object of the present invention is to preserve this undo function in a system in which the services supplied by the server stations are remunerated and invoiced to a client station of the network.

In particular it enables functions to be undone in a collaborative environment in which several client stations have access to the services of one server station.

To this end, the undo method concerned by the invention enables the remote undoing of a function requested by a first client station on a computer object stored on a server station of a communication network, the execution of the function being adapted to manipulate the object from an earlier state to a manipulated state.

According to one embodiment of the invention, this undo method comprises steps of receiving a request to undo the execution of a function; obtaining the earlier state of the manipulated object; and sending a response to the first client station via the communication network, the response comprising a sum of money less than or equal to an execution cost associated with the function.

The undo method according to the invention enables a client station to undo an operation performed previously and to reimburse the client station of the network having required this execution of the function with at least a part of the costs incurred for the execution.

Thus the user can be compensated for the costs incurred for the remote execution of a function when it is undone.

Moreover, the sending of the response enables the first client station to be informed of the undoing of the function executed earlier at its request.

According to a preferred feature of the invention, at the sending step, the sum of electronic money is less than or equal to a sum received by the server station for the execution of said function.

Thus the reimbursement amount is determined from the sum actually received by the server station for executing the function, which can include in particular possible reductions in the cost of execution of the function.

According to another advantageous feature of the invention, the sum of electronic money is strictly less than the sum received.

Thus the reimbursement is partial.

Although a complete reimbursement is obviously more advantageous for the user, there is a risk that the latter may abuse the function of undoing operations in such a case.

A partial reimbursement thus forces the users to utilize the function of undoing a function more sparingly, whilst enabling them, nevertheless, to correct possible manipulation errors.

According to another preferred feature of the invention, this undo method further comprises a step of calculating an undo cost associated with the undo request received, the sum of electronic money being calculated after deduction of the undo cost.

Thus the undo function can itself be charged for, like other functions remotely executable on the server station.

This execution cost of the undo function, or undo cost, is thus deducted from the amount to be reimbursed.

According to a another preferred feature of the invention, the undo method further comprises a step of generating electronic money on said server station, associated with said first client station.

Thus the server station generates its own electronic money for reimbursing the client station having required the execution of the undone function.

In practice, when each executed operation is remunerated by means of electronic money generated by the client station, it is not possible to undo this payment by returning the money received.

This is because there is no guarantee for the client station that the server station will not keep a copy of the electronic money coins reimbursed with a view to fraudulent use.

Generating electronic money peculiar to the reimbursement resolves this problem.

According to a preferred feature of the invention, the undo method comprises a step of receiving a request to undo the execution of a function, sent by a second client station of the communication network, this undo request comprising a sum of electronic money, and a step of sending a second response to the second client station via the communication network, the second response comprising a sum of electronic money less than or equal to the sum of electronic money included in the undo request.

For each undo request of a function, it is possible to identity the client station having requested the earlier execution of the function such that the sum of electronic money corresponding to the at least partial reimbursement of the execution cost is in fact sent to the client station having required the execution of the function.

Thus, when the client station requiring the undoing of a function is different to the client station having required its execution, the server station sends two responses: a first response to the first client station having required the execution of the function, in which a reimbursement amount is included, and a second response to the second client station, having required the undoing of the function.

This second response may comprise a sum of electronic money equal to the sum of electronic money included in the undo request, in which case the undoing of the function costs nothing to the second client station. It may also be strictly less than the sum of electronic money included in the undo request, in which case a certain undo cost is borne by the second client station of the communication network.

In practice, the undo method comprises a step of calculating an undo cost associated with the undo request received by the second client station of the communication network, and, at the step of sending the second response, the sum of electronic money is calculated by deducting said undo cost from the sum of electronic money included in the undo request.

Thus, the undo cost is also borne by the user requesting the undoing of the execution of a function. This makes it possible to avoid a user of a communication network too often undoing functions carried out earlier by other users of the communication network.

In practice, an undo cost can be invoiced both to the first client station, having required and paid for the execution of the function, and to the second client station, having required the undoing of the function. It is thus possible to share the costs of undo's between the different users of the communication network.

In a complementary manner the present invention also relates to a device for undoing a function requested by a first client station on a computer object stored on a server station of a communication network, the execution of the function being adapted to manipulate said object from an earlier state to a manipulated state.

One embodiment of this undo device comprises means for receiving a request to undo the execution of a function; means for obtaining the earlier state of the manipulated object; and means for sending a response to the first client station via the communication network, the response comprising a sum of money less than or equal to an execution cost associated with the function.

This device for undoing an operation, incorporated in a server station, has features and advantages similar to those described above for the method of undoing an operation on a server station.

The present invention also concerns a server station adapted to implement the method of undoing an operation in accordance with the invention.

It also concerns a computer and a communication network adapted to implement the method of undoing an operation according to the invention.

Finally, the present invention relates to a computer program which can be read by a microprocessor, comprising portions of software code adapted to implement the method of undoing an operation according to the invention when the computer program is loaded onto a microprocessor.

This communication network, this computer, this server station and the computer program have features and advantages similar to those described above.

Still other particular features and advantages of the invention will appear in the following description

BRIEF DESCRIPTION OF THE DRAWINGS

In the accompanying drawings, given by way of non-limiting example.

DETAILED DESCRIPTION

Figure 1:
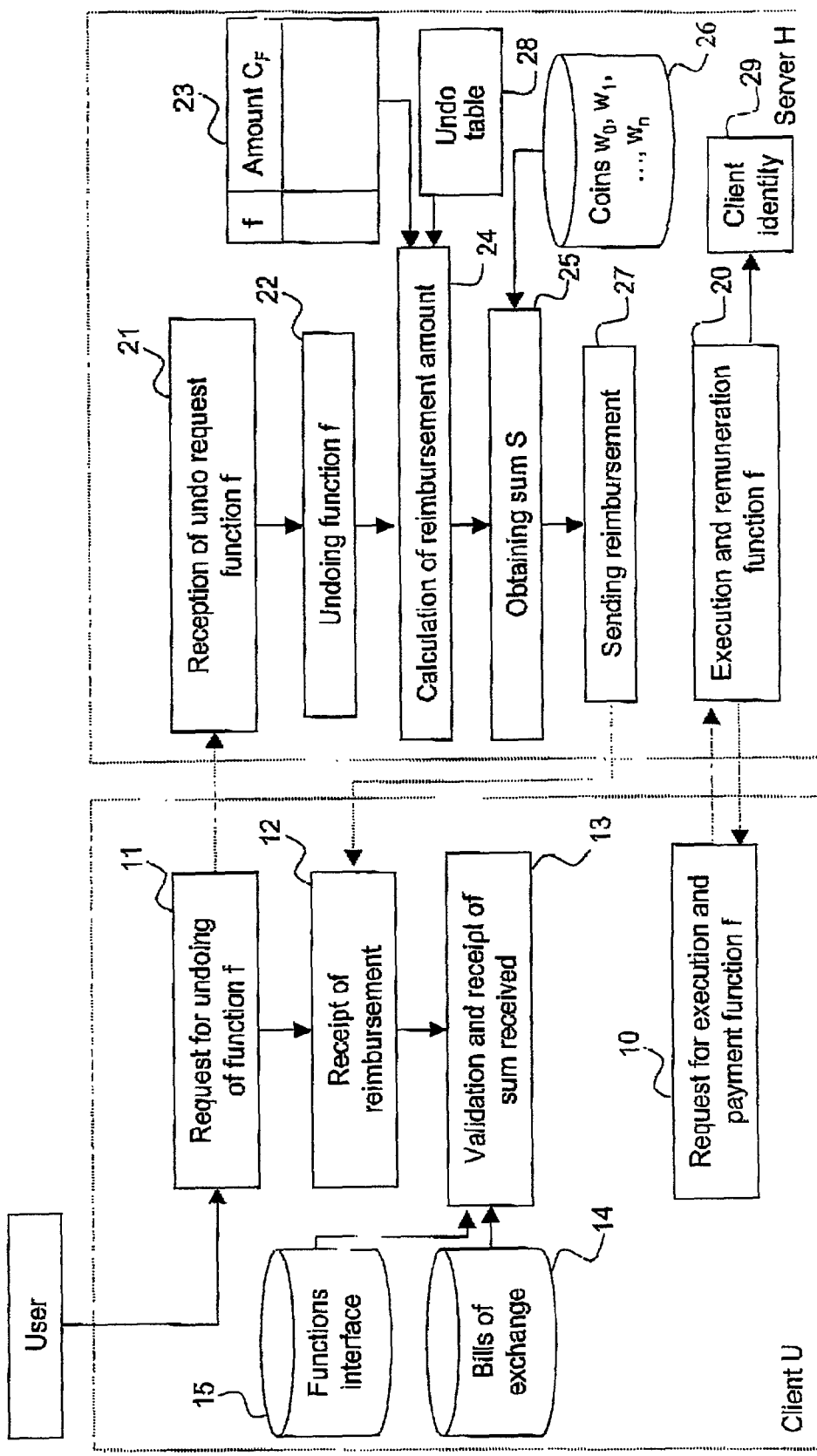
FIG. 1 is a block diagram illustrating a client station and a server station in a communication network adapted to implement the method of undoing an operation according to the invention.

A description will first of all be given, with reference to FIG. 1, of a communication network adapted to implement the method of undoing an operation according to the invention.

In what follows, a client station U connected to a server station H will be considered. Naturally, in a communication network, the different computers in the network can in turn be client station U or server station H.

Furthermore, in a communication network, several client stations are in reality connected to each server station H.

In this example, the client station U can use the services of the server station H. In particular, the client station U can request the execution of an operation directly on the server station H.

Each operation corresponds to a series of instructions of a computer program.

Naturally, the client station U could also request other services from the server station H, for example the supply of a document.

By way of example that is in no way limiting, the server station can store digital images, and a user can, through the client station U, perform operations on one of the images of the server station H.

The operations may be the conversion of an image into black and white, the rotation of the image or a reflection with respect to a horizontal or vertical axis of the image.

When such an operation is remotely executed, the image will continue to be stored on the server station H and will not pass over the communication network, The client station will merely send a request for remote execution of the operation to the server station.

In the remainder of the description, a distributed object system will be considered. A computer object is an element comprising data, also referred to as attributes, and functions or methods possibly using input arguments. In such a system, the functions can be invoked in order to manipulate the data of the object.

The interface of an object is constituted by all the functions applicable to the object as well as attributes.

In practice, the client station U comprises execution and payment request means 10 for executing a remote function f on an object o stored on the server station H.

These means do not need to be described in detail here for the remainder of the disclosure of the invention.

For implementing the invention, the client station U comprises means 11 of sending a request to undo a function f previously executed on the server station H.

As will be clearly described below, this function f to be undone may have been executed at the request of any client station of the communication network.

It also has means 12 of receiving a reimbursement amount sent back by a server station H.

Means 13 for validating and levying the sum received enable validation of the reimbursement amount sent back by the server station H.

In particular, storage means 14 make it possible to store bills of exchange for authenticating the reimbursement amount received.

The implementation of these different means will be explained in detail with reference to FIGS. 6 to 8.

In a complementary manner, the server station H comprises execution and remuneration means 20 for executing functions following the reception of an execution request sent by a client station U.

These execution and payment means 20 cooperate with the execution and payment request means 10 of the client station U so as to execute and invoice each function f on a computer object o.

These execution and payment means 20 cooperate with storage means 29 making it possible to store the identity of each client station $U_P$ of the communication network in association with each function f executed at the request of that client station $U_P$.

It also comprises means 21 for receiving a request to undo a function f and means 22 for undoing this function f which make it possible to return to a state of the object o preceding the execution of this function f.

In this embodiment, storage means 23 enable the sum received $C_f$ by the server station H to be stored for the execution of each function f. These storage means 23 cooperate with calculation means 24, making it possible to read and calculate the reimbursement amount.

These obtaining means 24 further comprise modes for calculating an undo cost and means for comparing the number of undo requests received, stored in an undo table 28, with a predetermined threshold value.

Obtaining means 25 make it possible to obtain a sum of money S corresponding to the reimbursement amount.

These obtaining means 25 cooperate with coin storage means 26 so as to take a sufficient number of coins, at least equal to the reimbursement amount associated with the function to be undone.

Sending means 27 enable the reimbursement amount to be sent to each client station.

Figure 3:
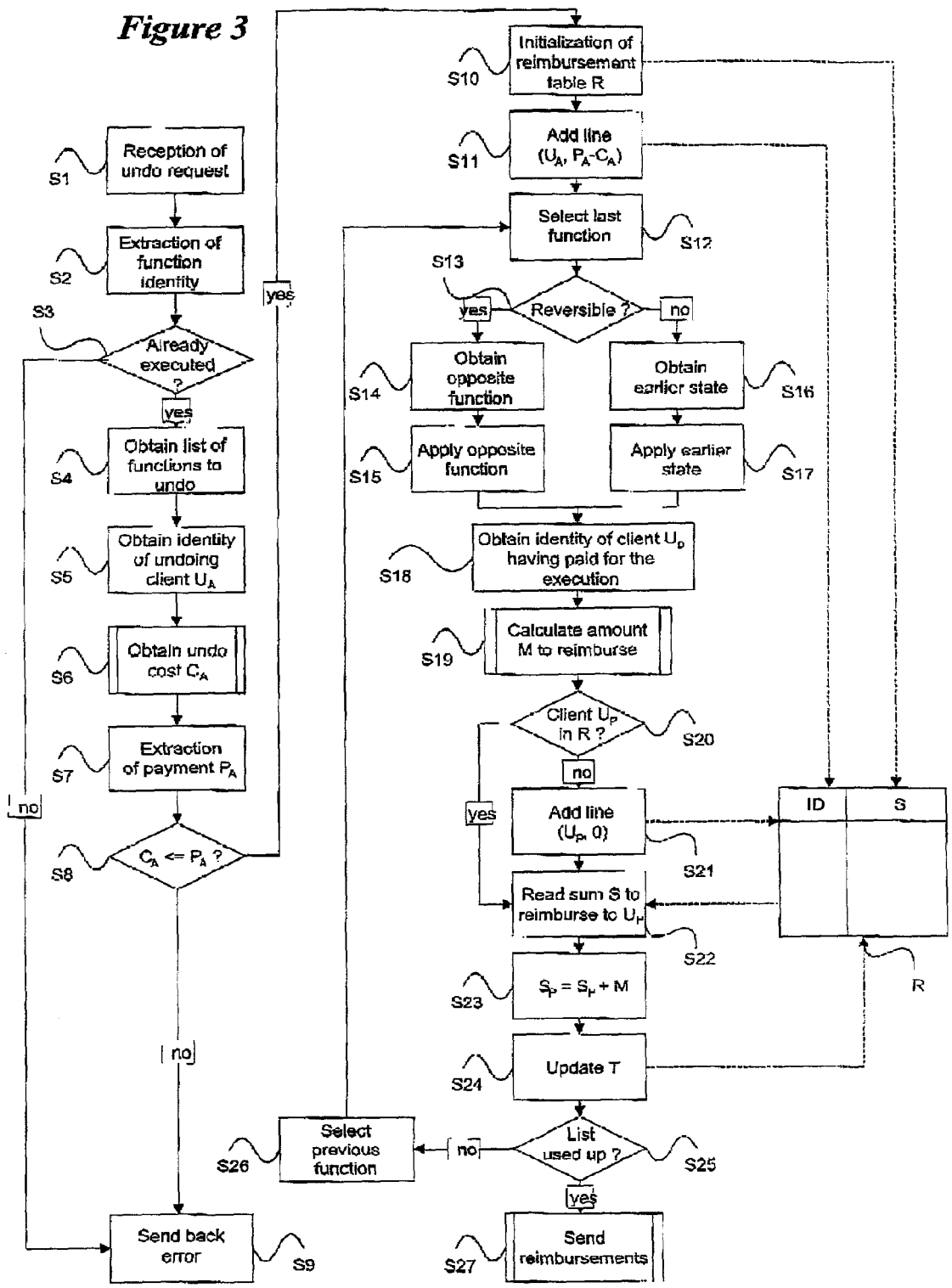
FIG. 3 is an algorithm illustrating the method of undoing an operation implemented on a server station according to one embodiment of the invention.

With reference to FIG. 3 and the subsequent Figures, the operation will be explained below of all these means which make it possible to reimburse a client station when the execution of a function f is undone.

Figure 2:
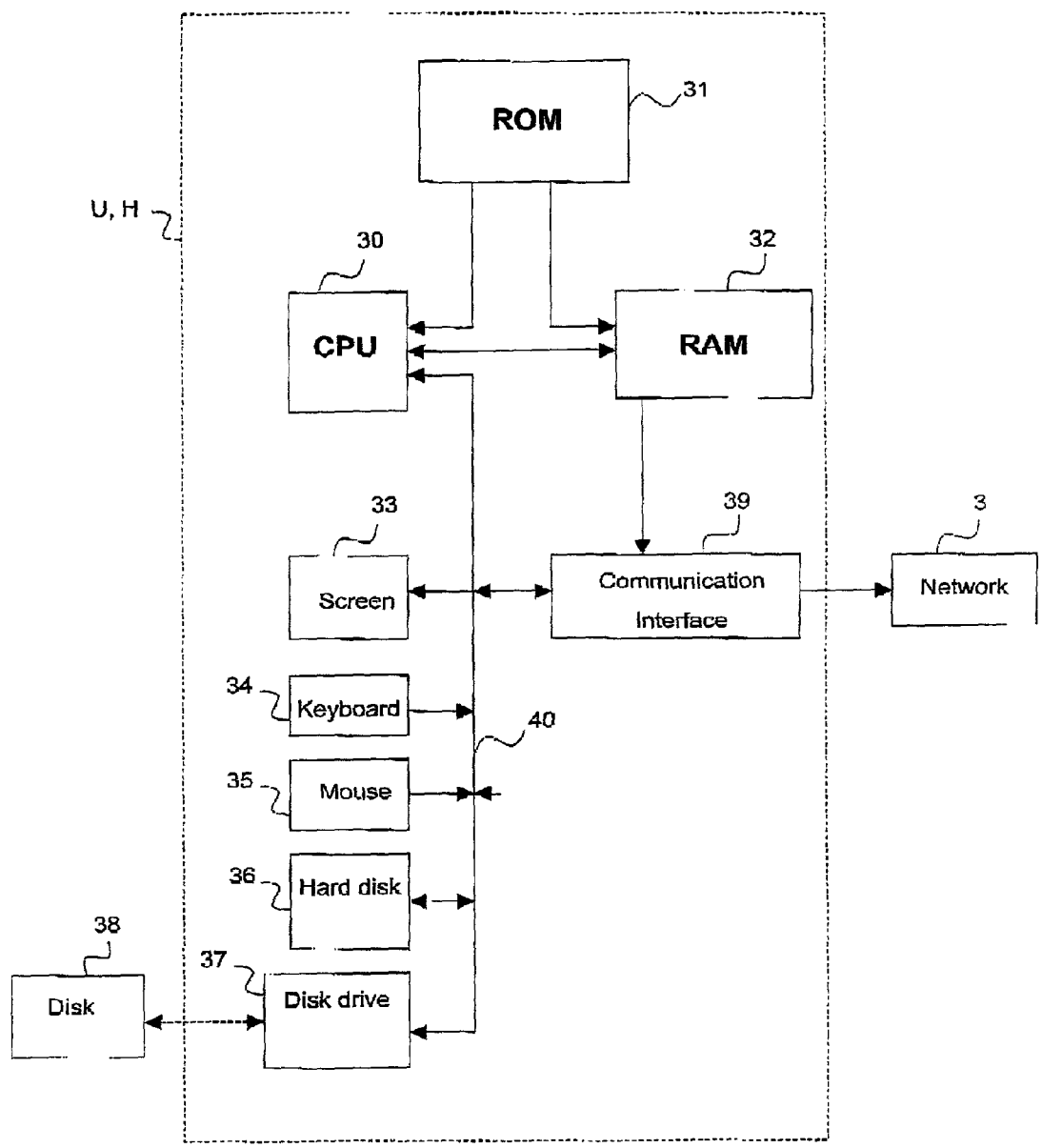
FIG. 2 is a block diagram illustrating a computer adapted to implement the invention.

All these means 10-14 and 20-29 can be incorporated either at the client station U or at the server station H in a computer as shown in FIG. 2.

This computer comprises, in a typical manner, a microprocessor 30, a read only memory 31 (ROM) and a random access memory 32 (RAM) comprising different registers for implementing the method according to the invention.

The computer comprises in particular a communication interface 39 which can be connected to a communication network 3 for receiving or transferring requests or information.

In addition, the computer comprises document storage means, such as a hard disk 36, or is adapted to cooperate, by means of a disk drive 37, with removable storage means 38 such as diskettes, compact discs or computer cards (PC cards).

These fixed or removable storage means can contain the code of the execution method of operations according to the invention which, once read by the microprocessor 30, will be stored on the hard disk 36.

As a variant, the program enabling the device to implement the invention can be stored in the read only memory 31.

As a second variant, the program can be received for storage as described previously via the communication network 3.

In a typical manner, the computer also has a screen 33 serving, for example, as an interface with an operator using a keyboard 34 or a mouse 35 or any other means.

The central processing unit or microprocessor 30 (CPU) will execute instructions relating to the implementation of the invention.

On powering up, the programs and methods relating to the invention, stored in a non-volatile memory, for example the read only memory 31, are transferred into the random access memory 32, which will then contain the executable code of the invention as well as the variables necessary for implementing the invention.

Thus the random access memory 32 incorporated into a client station in a communication network will comprise registers 14 for storing in particular the bills of exchange delivered by each server station H.

Likewise, the random access memory 32 incorporated in a server station of a communication network will comprise registers for storing at least one table of coins 26, and the amount received 23 for executing each function, the identity 29 of the client station associated with the execution of each function and an undo table 28.

A communication bus 40 affords communication between the different sub-elements of the computer or connected to it.

The representation of the bus is not limiting and in particular the microprocessor is liable to communicate instructions to any sub-element directly or by means of another sub-element.

A description will now be given, with reference to FIG. 3, of the method of undoing an operation as implemented on the server station H of the communication network, according to a preferred embodiment of the invention.

The method of undoing an operation comprises first of all a step S1 of receiving a request for undoing the execution of an operation.

This undo request is sent by client station $U_A$ of the communication network.

It should be recalled here that each computer object o is written in a programming language used by the computer application peculiar to the computer which stores o and that it is consequently necessary to use a communication language common to the communication network in order to share the computer objects and in particular to remotely invoke functions on these objects o.

On the Internet, it is possible to use a communication language such as XML ("extended Markup Languages")

The use of this communication language, making it possible to describe computer objects on the network and to remotely invoke functions on these objects, is described in detail in European patent application 00 401 754.7 filed by Canon Research Centre France S.A.

A description of the different data fields which it is necessary to translate into the communication language of the network in order to make it possible to remotely invoke functions on these objects o is given below.

Field: Interfaces

This field makes it possible to send several interfaces to remote applications.

<interfaces>
  <interface . . . </interface>
  . . .
</interfaces>

Field: Interface

This field corresponds to the generic concept of an object class, as defined in the JAVA or C++ languages.

An interface describes the operations or functions supported by a computer object o.

These operations generally use input arguments and possibly supply a result.

An interface also describes the attributes or data field which all the objects supporting this interface contain when they are translated into the communication language.

An interface can also contain a reference to other interfaces, whether they extend to these other interfaces or supply only a shortcut for using these other interfaces. The object then supports all these other referenced interfaces.

Field: attribute

This field comprises a list of the attributes which an object supporting the interface contains when it is translated into the communication language.

Field: functions

This field contains a list of the functions or operations associated with the computer object supporting this interface.

<functions>
  <function>. . . </function>
  . . .
</functions>

Field: function

This field corresponds to the generic concept of function. A function is identified by its signature, for example a name, the type of input argument used and the type of object obtained during the execution of this function.

Field: arguments

This field contains a list of the input arguments which a function requires for its implementation.

<arguments>
  <arg>. . . </arg>
  . . .
</arguments>

Field: argument

This field corresponds to an input argument of a function and can for example be a literal object or a complex object.

The function field thus makes it possible to invoke a function on a remote object. The target object o and the input arguments of the function must be specified as described above.

According to the invention, the function field can make it possible to invoke the function "undo" on a remote object o.

The name of the function to be undone is included in the argument field of the function "undo".

An extraction step S2 also makes it possible to extract the identity of an operation which is here a function f executed on an object o.

A test step S3 makes it possible to verify whether this function f has already been executed on the object o on the server station H following an execution request sent by a client station U of the communication network If not, in a sending step S9 the server station H sends back to the client station $U_A$ a response indicating that it is impossible to undo an operation f not executed.

If the operation f has already been executed, the list of functions to be undone is obtained in an obtaining step S4.

Indeed, if this function f is not the last function executed on the object o on the server station, the obtaining step 84 makes it possible to obtain the list of operations executed after the execution f of this operation f to be undone.

Naturally, if the function f to be undone is the last function to executed, this list is restricted to this sole function f.

An obtaining step S5 is implemented in order to obtain the identity of the client station $U_A$, generally incorporated in the request to undo the execution of an operation An obtaining step S6 is next implemented in order to obtain an undo cost $C_A$.

In fact, as described later, the amount of the reimbursement made on the undoing of a function is calculated from an amount received and preferably takes into account an undo cost $C_A$.

This is because a complete reimbursement, corresponding to the amount actually received for the execution of the function is more advantageous for each user of the communication network, but there is a risk that the server station H may be overcharged.

With the operations undone costing the users nothing, this may give rise to abuse by the users. On the other hand, a partial reimbursement forces the users to be more sparing in the utilization of the undo function whilst enabling them, nevertheless, to correct possible manipulation errors.

Thus, in other words, the undo function is itself be charged for, like other functions remotely executable on the server station H.

An undo cost $C_A$ associated with each undo request can thus be calculated.

A calculation example will be desired below with reference to FIG. 4.

Preferably the server station will apply a sliding scale so that each new undo will be a little less reimbursed than the previous one.

In practice, the undo cost $C_A$ will be increased with each new undo request received by the server station H and sent out by a same client station $U_A$ of the communication network.

Preferably also this sliding scale will not be applied immediately. Each client station U will benefit from a certain undo "credit" so that the undo cost will be zero if the number of undo requests n sent by the client station U remains below a predetermined threshold value T.

The procedure for calculating the undo cost $C_A$ will be described in an example embodiment with reference to FIG. 4.

An initialization step S401 first of all makes it possible to initialize the undo cost $C_A$ to zero.

Next, an obtaining step 8402 enables the identity to be obtained of the client station U which sent a request for undoing a function.

A test step S403 enables it to be verified whether this client station U is known to the server station S.

If not, an adding step 8404 makes it possible to store the identity of this client station U in an undo table 28 in association with the number n of undo requests sent out by this client station U, here initialized with the value 0.

After the adding step S404 or directly after the test step S403, a reading step S405 makes it possible to read from the undo table 28 if the client station U is known, the number of undo's n carried out previously for the client station U.

An obtaining step S406 makes it possible to obtain the function F to undo requested by the client station U.

It is then checked, in a test step S407, whether the number of undo's n is greater than or equal to a predetermined threshold value T, for example equal to 20.

If not, that is to say if the number of undo's n sent out by the client station U remains strictly less than this threshold value T, a step S411 of updating the number of undo's is implemented such that the number n of undo's is incremented by one unit.

Otherwise, if at the end of the test step S407 the number of undo's n is greater than or equal to the threshold value T, an obtaining step S408 makes it possible to obtain from the storage means 23 the amount received $C_F$ for the execution of the function F to be undone.

A calculation step S409 next enables the unit cost c to be calculated for this function F to be undone.

In practice, this undo cost C represents a fraction of the amount received $C_F$.

Here, by way of non-limiting example, the undo cost C is calculated by the following formula:

The value of the undo cost C may thus vary between 0 and $C_F \times t$. The parameter t thus represents the maximum reimbursable rate of the execution cost received for the execution of the function to be undone.

The greater the parameter D, the more the undo cost C varies slowly.

In fact, when n−T=D, the undo cost C is equal to half the maximum reimbursement value $C_F \times t$.

A step S410 of updating the value of the undo cost $C_A$ is next implemented such that:

$$C_A = C_A + C$$

The unit undo cost associated with the undoing of the function F is thus added to the overall undo cost $C_A$.

The updating step S411 already described is next implemented such that the number of undo's n is incremented by one unit.

A test step S412 enables it to be verified if another function must be undone in the list of functions obtained earlier at the obtaining step S4 This is because the undoing of a function may necessitate, as already described, the undoing of other functions executed later than the function F to be undone.

If this is the case, the next function F to be undone is obtained in an obtaining step S413, and for this function all of steps S407 to S412 described previously are reiterated.

When all the functions to be undone have been processed, and that each unit cost C associated with each function F has thus been calculated and all of them added together, an update step S414 enables the undo table 28 to be updated with the number of undo's n associated with the client station U having required the undoing of a function.

A response step S415 enables the value calculated for the undo cost $C_A$ to be addressed for the continuation of the undo method as shown in FIG. 3.

Returning to FIG. 3, an extraction step S7 is next implemented in order to extract a payment $P_A$ included in the undo request sent out by the client station $U_A$.

This is because, as already described, the undo function is preferably a function that is charged for, at least as from a certain number of undo's requested by the client station, such that a payment $P_A$ must be included in the undo request for the execution of that undo.

This payment may be made by the introduction of a sum of electronic money in the undo request.

A test step S8 enables the value of the undo cost $C_A$ obtained at step S6 to be compared to the payment value $P_A$ extracted at step S7.

If the payment value $P_A$ is strictly less than the undo cost $C_A$, an error message is sent back in a response step S9 in order to indicate to the client station $U_A$ that it is impossible to meet the request to undo the function F.

Otherwise, when the undo cost $C_A$ is less than or equal to the payment value $P_A$, the following steps S10 to S27 are implemented in order to determine the amount of me reimbursements to be made and the client stations U of the communication network to be reimbursed and in order to perform the actual undoing of the functions identified a step S4.

When undoing a function F on the server station H, it is fair to reimburse the client station having required the execution of that function and thus paid for its execution.

In practice, an initialization step S10 makes it possible to initialize a reimbursement table R.

This reimbursement table R makes it possible to associate with each client station U of the network, a sum S corresponding to a reimbursement amount to be returned to that client station U.

An updating step S11 makes it possible to add to the reimbursement table R first of all the sum to reimburse to the client station $U_A$ having required the undoing of a function.

In practice, the identity of the station $U_A$ is stored and a sum $S = P_A - C_A$ thus corresponding to the payment $P_A$ received from the client station $U_A$ from which is deducted the undo cost $C_A$ calculated earlier.

A selection step S12 next enables the last function executed to be selected from the list obtained at the obtaining stop S4.

In a test step S13 it is checked whether this function is reversible, that is to say whether there exists an opposite function making it possible to return to a previous state on the object o.

An example of a reversible function would be, during the manipulation of an image, a rotation of the image by a quarter of a turn to the right, the reverse function of which is the rotation of the image by a quarter of a turn to the left, a reflection with respect to an axis, the opposite function of which is the function itself, and/or a function of enlarging by a predetermined ratio, the opposite function of which is the function of reducing the image by the same ratio.

Where this function is reversible, its opposite function is obtained in an obtaining step S14 and then, in a step S15, this opposite function is applied to the object o to be manipulated.

Otherwise, if the function is not reversible, the previous state which was stored during the execution of the function to be undone is obtained in an obtaining step S16, and this previous state is applied in a step S17.

In fact it is thus necessary to store the state of the system before each execution of each function and to return to this prior state on undoing.

Such is the case in particular for functions enabling an image to be transformed into black and white, to apply filters for the purpose of blurring or else for accentuating the details of an image.

For example, the software PhotoShop® keeps in memory each successive version of an image to enable any of the operations performed to be undone.

These two mechanisms of undoing an operation are well known to persons skilled in the art and will not be described in any further detail here.

In an obtaining step S18 the identity is next obtained of the client station $U_P$ having required, and thus paid for, the execution of the function undone earlier.

Figure 5:
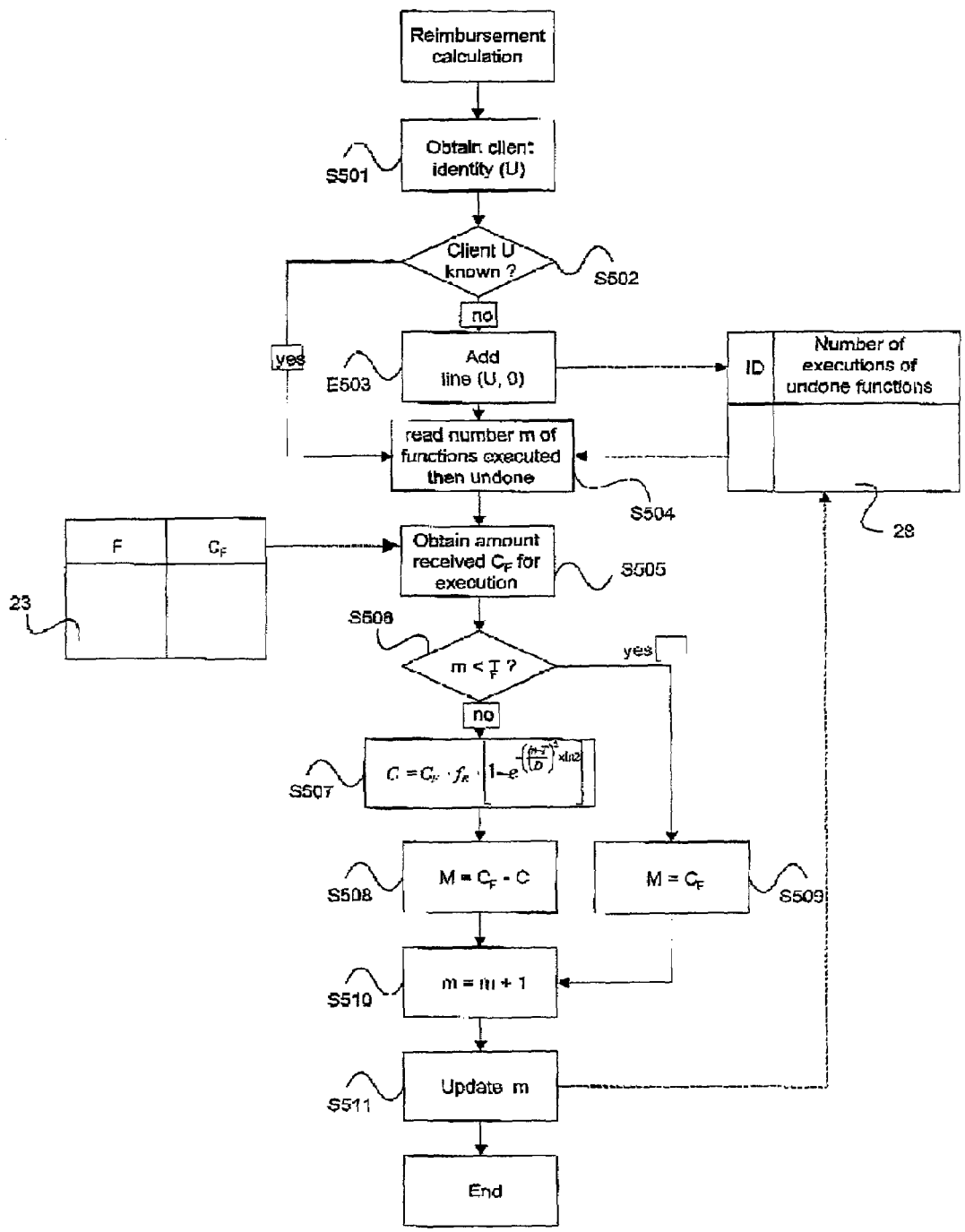
FIG. 5 is an algorithm detailing the procedure for calculating an amount to be reimbursed used in FIG. 3.

A calculation step S19, detailed in FIG. 5, enables the calculation to be made of an amount M to be reimbursed to this client station $U_P$ for the undoing of this function.

This procedure for calculating the amount M to be reimbursed will be described in an example embodiment with reference to FIG. 5.

An obtaining step S501 makes it possible to obtain the identity of the client station U which executed and paid for the function to be undone.

A test step S502 enables it to be verified whether this client station U is known to the server station S.

If not, an adding step S503 makes it possible to store this client station U in an undo table 28 in association with the number m of requests to execute functions which are then undone, sent out by this client station U. This number m is initialized here with the value 0.

After the adding step S503, or directly after the test step S502 if the client station U is known, a reading step S504 makes it possible to read from the undo table 28 the number m of executions of functions then undone that were carried out previously by the client station U.

A reading step S505 makes it possible to read in the storage means 23 the amount $C_F$ received on execution of the function.

In fact, for each function, an execution cost c is associated and generally stored in the interface of the object o.

However, the amount $C_F$ actually received by the server station H may be less than this execution cost c, in particular when the server station applies discounts.

The reimbursement amount M will therefore always be less than or equal to the execution cost c associated with the function, and in particular less than or equal to the amount actually received $C_F$ when this function is executed by the server station.

It is then checked, in a test step S506, whether the number m of executions of undone functions is greater than or equal to a predetermined threshold value T, for example equal to 20.

If not, that is to say if the number m of executions of undone functions sent out by the client station U is strictly less than this threshold value T, step S509 of calculating the amount M to reimburse is implemented such that the amount $M=C_F$.

Thus, so long as the number m of executions of undone functions remains less than the threshold value T, the amount reimbursed to the client station U corresponds exactly to the amount $C_F$ invoiced on execution of the function to be undone.

A step S510 of updating the number m is next implemented such that the number m of executions of functions then undone is incremented by one unit.

Otherwise, if, at the end of the test step S506, the number m of executions of undone functions is greater than or equal to the threshold value T, a step S507 of calculating an undo cost C is implemented as previously.

By way of non-limiting example, the undo cost C is calculated by the following formula:

As previously, the value of the undo cost C may vary between 0 and $C_F \times t_R$, where $t_R$ is a maximum rate of reimbursement which is a function of the amount $C_F$ actually received on execution of the function.

An association step S508 next enables the reimbursement amount M to be calculated such that:

$$M=C_F-C$$

An undo cost C, which depends on the number m of executions of undone functions required by the client station U, is thus deducted from the amount $C_F$ actually received, The reimbursement amount M will thus be strictly less than the amount actually received $C_F$ on execution of the function.

The step S510 updating the number m of executions of undone functions is also implemented after the calculation step S508 so as to increment this number m by one unit.

From this new value m the undo table 28 is next updated in an updating step S511 then the procedure for calculation of reimbursement M is terminated and the calculated value M is addressed for the continuation of the implementation of the undo method as shown in FIG. 3.

Next the reimbursement table R is updated.

In practice, it is verified whether the client $U_P$, which paid for the execution of the function and for whom the amount M to be reimbursed has just been calculated, is known and already stored in the reimbursement table R.

If not an adding step S21 enables the identity of this client station $U_P$ to be stored in the reimbursement table R in association with a sum S to be reimbursed, here initialized to 0.

A reading step S22 next makes it possible to read the sum $S_P$ associated with the station $U_P$ to be reimbursed based on the value stored in the reimbursement table R.

This reading step S22 is implemented directly at the end of the test step S20 when the client station $U_P$ is already stored in the reimbursement table R.

The sum $S_P$ to reimburse to this client station $U_P$ is next updated in a calculation step S23 in which:

$$S_P=S_P+M$$

The reimbursement amount M calculated prior to the calculation step S19 is thus added to the overall amount to reimburse to the station $U_P$.

An updating step S24 next makes it possible to store this new value of the amount to reimburse $S_P$ in the reimbursement table R in association with the identity of the client station $U_P$.

A test step S26 enables it to be checked whether the list of functions to be undone is used up If not, in a selection step S26, the previous function is selected from this list and for this function all of steps S12 to S25 described previously are reiterated.

Thus for each function to be undone there is calculated the reimbursement amount M in association with the client station U having paid for the execution of this function to be undone When the list of functions to be undone is used up, at the end of the test step S25, a sending step S27 enables the actual sending to be made of the reimbursements to each client station of the communication network, based on the identity of these client stations and the associated reimbursement values S stored in the reimbursement table R.

Figure 6:
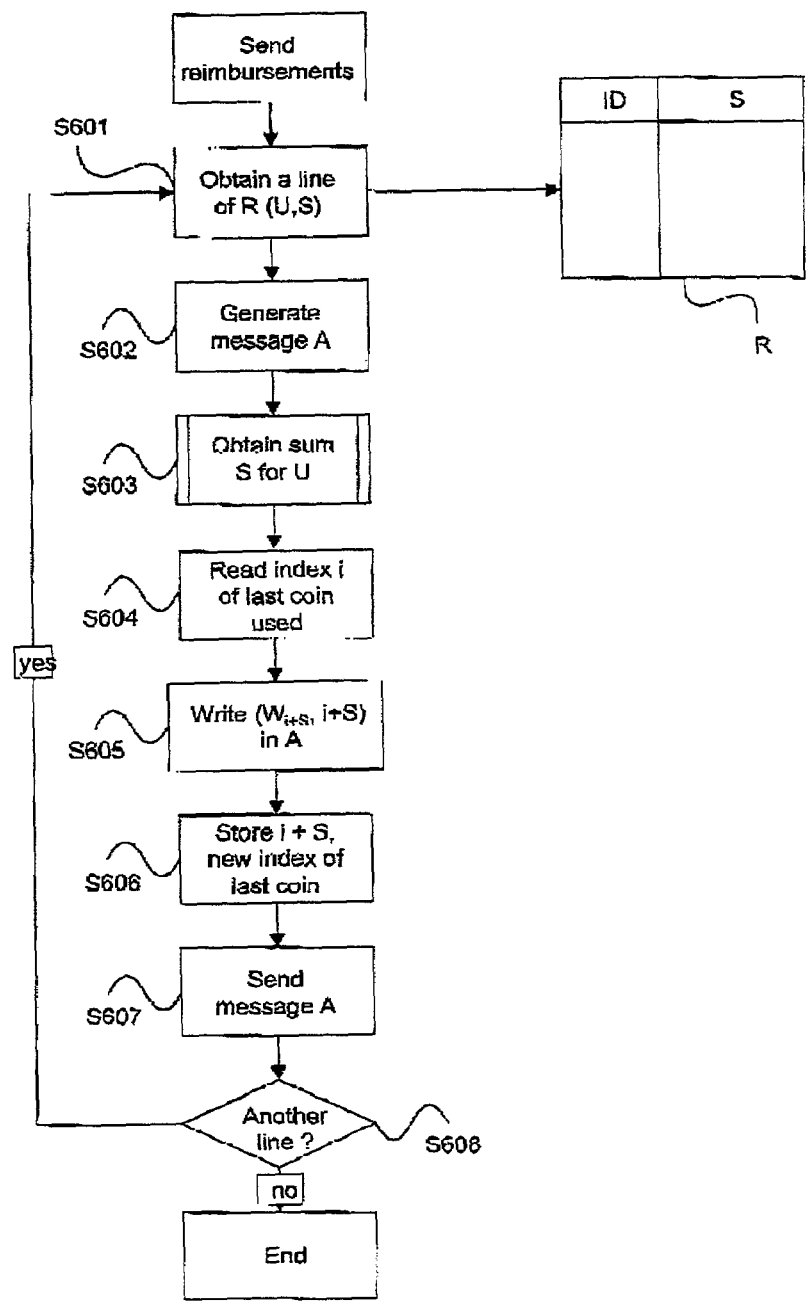
FIG. 6 is an algorithm detailing the procedure for sending a reimbursement used in FIG. 3.

In practice, as shown in FIG. 6, to send the reimbursements, several response messages are generated which are addressed to the client stations of the communication network.

In an obtaining step S601, a first line of the table R Is read, that is to say the identity of a client station U and a sum to be reimbursed S calculated earlier.

A response message A is next generated in a step S602 destined for the client station U.

An obtaining step S603 is then implemented in order to obtain a sum S corresponding to the total sum to be reimbursed.

Figure 7:
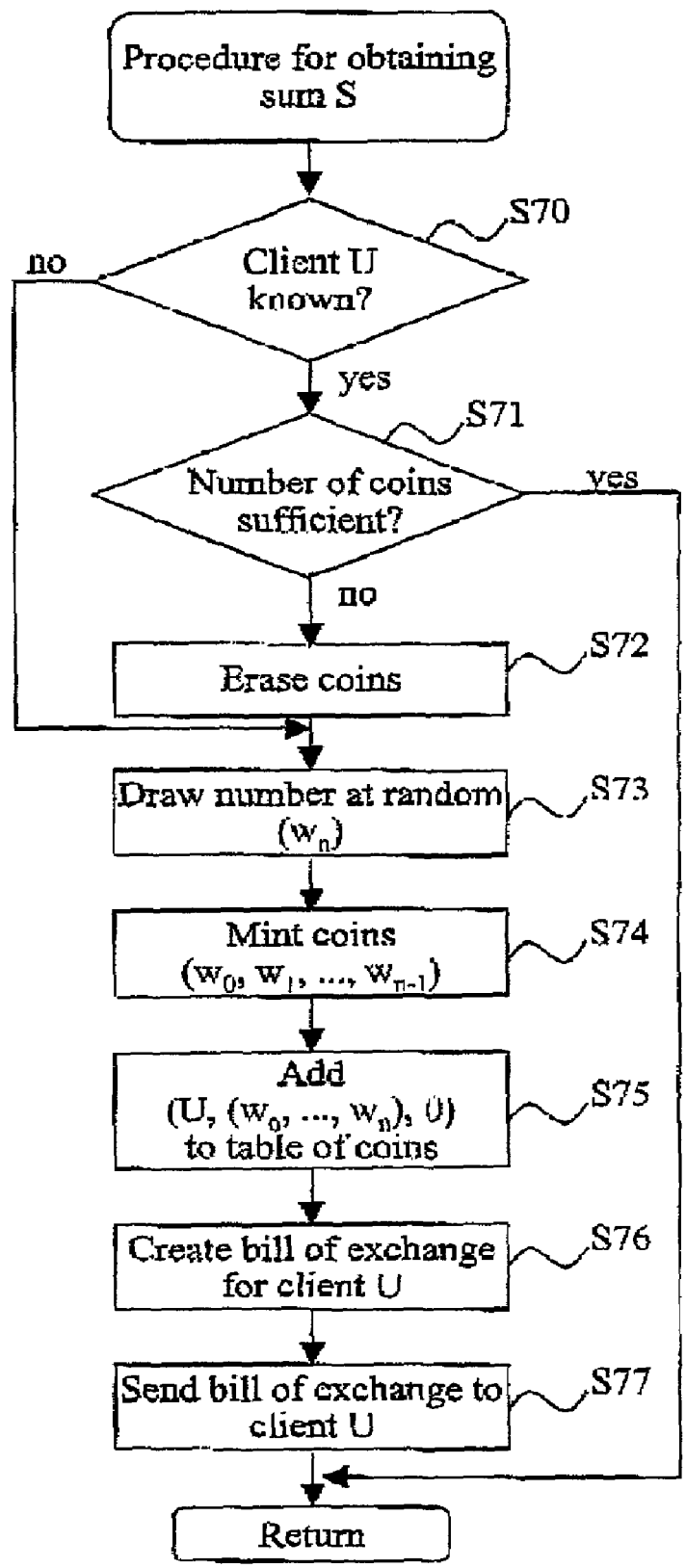
FIG. 7 is an algorithm detailing the procedure for obtaining a sum of money used in FIG. 6.

This step is described in detail in FIG. 7.

Generally during this step, electronic money is generated on the server station H, this electronic money being associated with the client station U to be reimbursed and the amount of electronic money generated being greater than or equal to the sum to be reimbursed S.

In practice, the server station generates a chain of coins for each client station, this chain of coins being used for the consecutive reimbursements of the different operations undone by this client station.

In order to obtain this sum of money S, it is necessary to generate electronic money on the server station H in order to create a series of coins which can then be spent on the communication network in order to reimburse Pi the client station U.

By way of example use may be made of a system for generating this electronic money known as PayWord provided by Rivest and Shamir.

A description of this system can be found in "PayWord and MicroMint: Two simple micropayment schemes", by Ronald L. Rivest and Adi Shamir, MIT Laboratory for computer science, May 7, 1996.

This system generally consists of generating a series of numbers by means of a hash function, using a random number $W_n$.

This PayWord system has the advantage of being reliable and not requiring the approval of a third party body (bank, notary, etc) to validate each individual payment In practice, it is checked, in a test step S70, whether the client station U is known to the server station H. If not, the server station draws a number at random in a random drawing step S73. Let the random number be $W_n$.

There is next applied, in a coining step S74, recursively, a known hash function such as:

$$W_{n-1} = h(W_n)$$

This hash function h has the particularity of not being reversible, so that it is impossible, from a number $W_{n-1}$, to find the previous number $W_n$.

In this way a series of coins $W_n$, $W_{n-1}$, ... $W_2$, $W_1$, $W_0$ is obtained.

The end $W_0$ of the chain of numbers thus obtained is known as the root coin and makes it possible to verify the authenticity of the different coins.

This PayWord system advantageously makes it possible to verify the authenticity of the coins simply by applying the hash function.

When such electronic money is generated, it is necessary for the server station H to obtain a bank certificate in order to prove its identity.

Two certificates are used:
a bank certificate $C(PK_e)$, issued by a bank in response to a request from the server station: and
a bill of exchange $C(W_o)$ generated directly by the server station H.

The bank certificate $C(PK_e)$ is an assurance for each user that the bank will honor any request for redemption of authentic coins. The bill of exchange $C(W_o)$ is an assurance for each user that the coins produced by the server station are indeed authentic and will be honored by the bank.

In practice, the server station sends to a banking organization the number of its credit card and its public key $PK_e$.

The banking organization returns a bank certificate $C(PK_e)$ which contains the identity of the banking organization, the identity of the server station and the public key of the server station $PK_e$. This certificate also includes an electronic signature authenticating the information which it contains, this signature being made by the bank using its private key $SK_b$.

Once the different coins $W_0$, $W_1$, ..., $W_n$ have been generated, these coins are stored in a storage step S75 in the table of coins 26 as illustrated in FIG. 1 in association with an identifier of the client station U and an index i, initialized with the value 0, corresponding to the index of the last coin used in the table of coins 26.

In addition, using the bank certificate $C(PK_e)$ obtained from the bank, the server station H generates, in a bill of exchange creation step S76, a certificate or bill of exchange intended for the client station U.

Each bill of exchange contains the bank certificate $C(PK_e)$ previously received, the identity of the client U for which it is intended, and the root coin $W_o$. This bill of exchange also includes an electronic signature authenticating the information which it contains, this signature being made by the server station using its private key $SK_e$.

After this step S76 of creating a bill of exchange, this bill of exchange is sent to the client station U in a sending step S777.

The bills of exchange and the coins are specific to a given user.

Finally, the client station U receives, by means of the certificate $C(PK_e)$, the following information: the identity of the banking organization and of the server station, the public key of the server station $PK_e$, and the root coin $W_o$.

It will be recalled that the public key of the server station $PK_e$ is contained in the bank certificate $C(PK_e)$. The authenticity of this key can therefore be established by comparing the value obtained by decoding the signature on this certificate by means of the bank public key $PK_b$, with the initial information contained in this certificate (excluding the signature).

Moreover, it will be recalled that the coin $W_o$ is contained in the bill of exchange from the server station $C(W_o)$. The authenticity of this coin can therefore be established by comparing the value obtained by decoding the signature on the certificate by means of the public key $PK_e$ previously authenticated, with the initial information contained in this certificate (excluding the signature).

Thus, by means of a double signature, each client is capable of verifying that he is indeed in possession of a root coin $W_o$ issued by a server, known to the bank, and authorized by the latter to issue electronic money coins.

If at the end of the test step S70 the client station U is already known, it is checked in a test step 871 whether the table of coins 26 contains sufficient coins which can be used by this server station H for reimbursing the reimbursement sum S to the client station U.

If not, an elimination step S72 erases the coins remaining in the table of coins 26 and the previously described steps S73 to S77 are implemented in order to generate new coins which can be used by the server station H for reimbursing the client station U.

Thus the table of coins 26 is automatically filled as soon as it no longer contains sufficient electronic money to reimburse the client station U.

The number of coins generated by the server station H may possibly depend on the frequency of use of this server station H by the client station U.

This number of coins can also be constant and determined once and for all.

It should be noted that it is preferable to generate a large number of coins during the coining step S74 and to store them in the table of coins 26 for subsequent use, that is to say when several functions executed by the client station U are undone by itself or by another client station of the communication network.

The coins generated each have a length, for example, of 32 bytes. The index of the coin in the series of coins generated can be encoded in 16 bits, which makes it possible to generate $2^{16}$ coins.

Returning to FIG. 6, the server station H implements a reading step S604 for reading in the table of coins 26 the index of the last coin used.

For a reimbursement sum S, and assuming that each coin WI corresponds to a unit fraction of this sum S, S coins are taken from the table of coins 26.

Here, the sum of money S reimbursed for the undoing of the function f is entered directly in the response sent to the client station U.

In practice, the value $(W_{i+S}, i+S)$ is entered in the response.

Naturally, at the reimbursement step, each calculated reimbursement amount M or the overall reimbursement sum S could be credited to an account associated with the client station U, and then be used for remunerating the execution of functions subsequently.

After this entering step S605, a storage step S606 makes it possible to store the new index i+S corresponding to the last coin used in the table of coins 26 for the client station U.

Thus the response A transmitted by the server station H during the sending step S607 contains the sum of money E corresponding to the undoing of the function requested.

Next it is verified in a test step S608 whether there exists another line in the reimbursement table R, that is to say another client station U to be reimbursed with a sum of money S.

If so, all the steps S601 to S607 described earlier are reiterated.

When all the lines of the reimbursement table R have been dealt with, the reimbursement procedure is terminated. Thus a response message A is sent both to the client station $U_A$ of the communication network having required the undoing of a function and to one or more other client stations of the communication network which have already executed and paid for the function or functions to be undone.

Naturally, when the client station $U_A$ requires the undoing of a function which it required and paid for the execution itself, it receives by way of reimbursement the amount actually received on execution of that function from which there may possibly be deducted an undo cost $C_A$.

Figure 8:
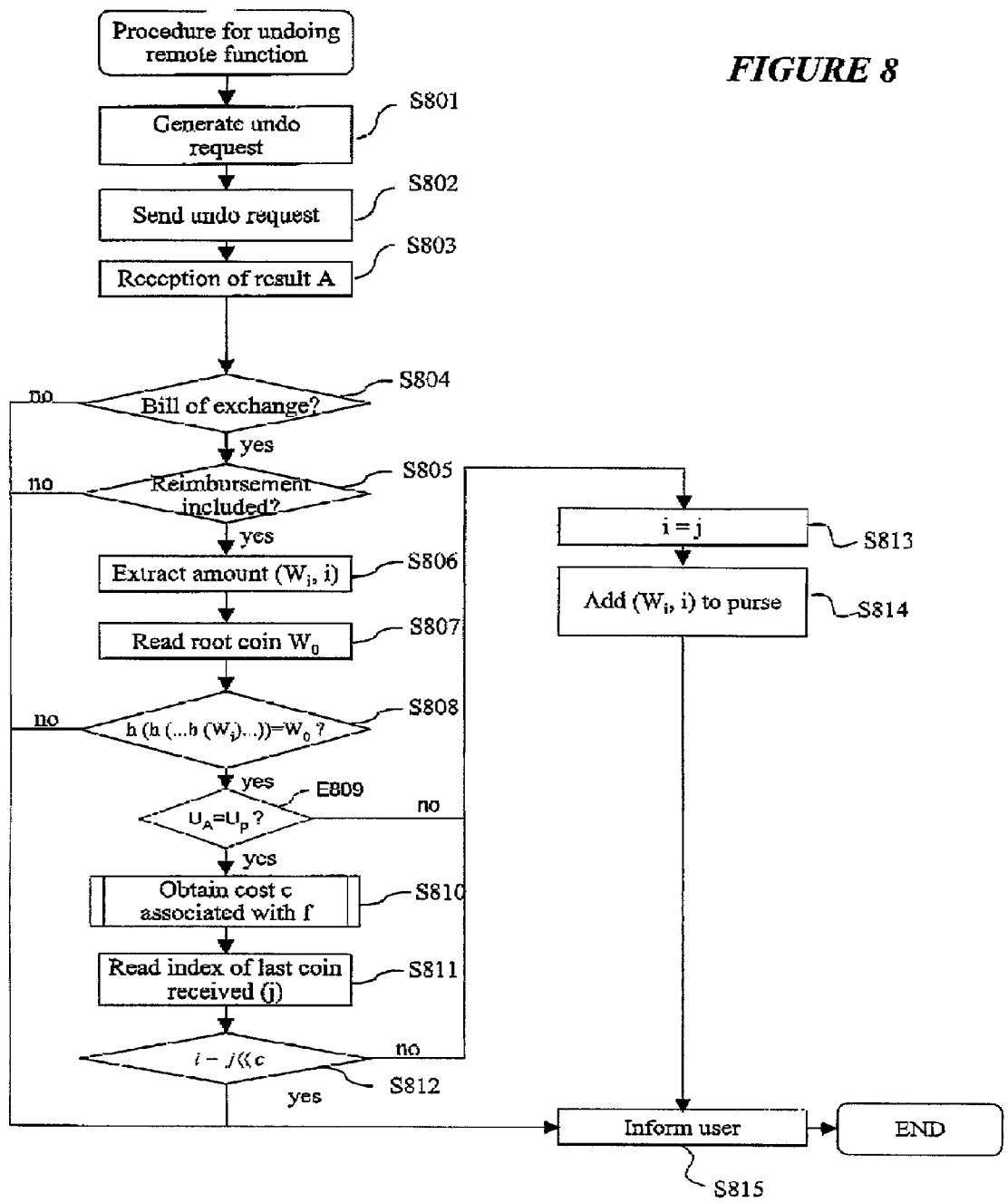
FIG. 8 is an algorithm illustrating a method of remote undoing of an operation implemented on a client station.

In parallel to the implementation of this method of undoing operations on the server station H, a method of requesting remote undoing of a function is implemented on the client station $U_A$, as illustrated in FIG. 8.

This method of requesting remote undoing of a function comprises first of all a step S801 of generating a request for remote undoing of a function.

This undo request includes a payment $P_A$, which may use the payment system Payword already described.

The request for remote undoing of a function on an object o is then sent in a sending step S802 by the client station U to the server station H.

Next, a step S803 of receiving a result makes it possible to receive a response A sent by the server station H at the end of the method of undoing operations as described above with reference to FIG. 3 and the subsequent Figures.

A test S804 enables it to be verified whether there exists a bill of exchange in the table 14 of the client station U corresponding to the server station H. The storage of such a bill of exchange will be described later with reference to FIG. 9.

If not, an information step S815 enables the user to be informed of this anomaly.

If this bill of exchange exists, a test step S805 makes it possible to verify that the response does indeed comprise, in a specific field, a sum of money S corresponding to a reimbursement.

As already described, when the client station $U_A$ requests the undoing of a function for which it has itself paid and required the remote execution, the sum to reimburse S corresponds to the sum of the payment $P_A$ sent and of the cost $C_F$ received by the server station for the execution of the function, from which is deducted an undo cost $C_A$.

If this client station $U_A$ has not itself required the execution of the function to be undone, the sum S to reimburse does not comprise the amount A-F received by the server station H for the execution of the function.

If no reimbursement is included in the response A, the procedure for processing the response is also interrupted.

Otherwise, an extraction step S806 is implemented in order to read the amount stored, corresponding here to a coin $W_i$ and to its index i in the chain of coins generated at the server station H.

From a reading of the bill of exchange in the table 14, it is possible to obtain the value of the root coin $W_0$ in a reading step S807.

A validation step S808 then makes it possible to verify the authenticity of the coin $W_i$.

In practice, the hash function h is applied recursively to this current coin $W_i$, here i times;

$$h(h( \ldots h(W_i)))$$

The value thus obtained is compared with the value of the root coin $W_0$.

It is also possible, in order to accelerate this validation step S808, to apply the hash function h recursively i−j times, that is to say a number of times just sufficient to find a coin $W_j$, of index j less than the current index i, and already sent by the server for reimbursement of the execution of a function to be undone.

If the value obtained is different, the procedure of processing the function execution request is interrupted.

Verification of the reimbursement by the client station U is a simple operation, consisting of applying a hash function. In particular, it is necessary neither to have recourse to a banking organization for verification, nor to implement expensive cryptographic methods.

After validation of the coins received, it is verified in a test step S809 whether the client station U having received the reimbursement is also the client station having earlier required the execution of the function. In practice, with reference to the algorithm of FIG. 3, it is verified whether the client station $U_A$ having required the undo is also the client station $U_P$ having required and paid for the execution of the function. It so, a step S810 of obtaining the cost c associated with the execution of the function f applied to the object o is implemented.

This step S810 of obtaining the cost is implemented as described below with reference to FIG. 9.

The execution cost c can be included directly in the response sent by the server station.

Figure 9:
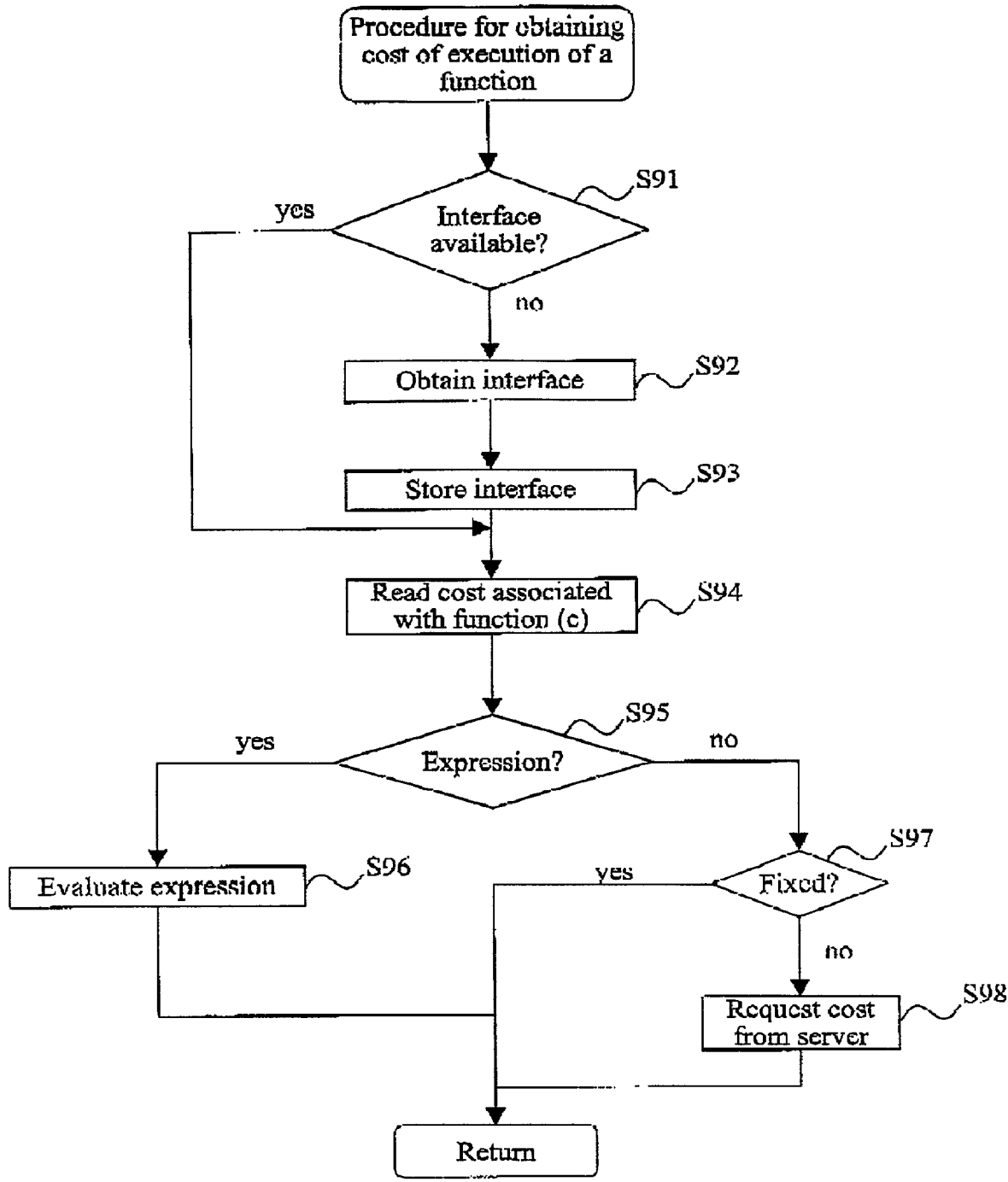
FIG. 9 is an algorithm detailing the procedure for obtaining a cost of executing an operation used in FIG. 8.

Otherwise, a particular procedure can be implemented for obtaining this execution cost, as illustrated in FIG. 9.

This procedure for obtaining the cost c of execution of the function f comprises first of all a test S91 for checking whether the interface associated with the object o is available on the client station U.

In practice, it is checked whether a corresponding interface has already been stored in the cache memory 15 of the client station U.

If not, a step S92 is implemented to obtain this interface from the server station H.

The request to obtain an interface comprises the computer address of the interface When the server station H receives the interface obtainment request, the server station extracts from this request the computer address referencing the requested interface.

The server station can, from a table, find the requested interface and transmit it to the client station U, possibly after translation of this interface into the communication language of the communication network.

As described previously, this interface comprises one or more functions associated with the execution code for these functions.

Each function is also associated with a cost of execution of this function.

An example of an interface making it possible to remotely manipulate an image is given below.

This interface comprises three functions:

"ConvertToB&W", whose price is constant, This function makes it possible to convert an image into black and white;

"Rotate", whose price depends on the size of the image and the angle of rotation. The price is expressed in the form of an expression which the client station can evaluate: this function makes it possible to change the orientation of an image:

"Flip", whose price depends on input arguments determined by the server station. The customer is not capable of making the price calculation itself; the price is for example available at the following computer address:

oceania/web-obj/class/Image.xml#flip#price
href=oceania/web-obj/class/Image.xml/

```
<interface
    name="Image"
    href=http://oceania/web-obj/class/Image.xml />
    <attributes>
        <int name="width" price="0.01 FF" />
        <int name="height" price="0.01 FF" />
        <string name="encoding" />
    </attributes>
    <functions>
        <function name="convertToB&W" price="0.5 FF">
        </function>
        <function name="rotate">
            <arguments>
                <int name="angle" />
            </arguments>
            <price>
                <currency name="FF" />
                <value language="JavaScript">
                    function price (width, height, angle) {
                        return width*height*angle;
                    }
                </value>
            </price>
        <function name="flip">
            <price>
                <currency name="FF" />
                <value />
            </price>
        </function>
    </functions>
</Interface>
```

After reception of the interface, a storage step S93 enables the interface to be stored for subsequent use in the cache memory 15 of the client station U.

A reading step S94 makes it possible to read in the interface received the cost c associated with the function f which it is wished to undo.

In a test step S95 it is verified whether the cost is an expression to be calculated.

If so, an evaluation step S96 enables the cost to be evaluated of the function to be executed from the expression received.

Such is the case, for example, for the rotation function "rotate".

Otherwise, it is checked in a test step S97 whether the cost of the function is fixed. Such is the case for example with the transformation of an image into black and white.

Otherwise an obtaining step S98 is implemented in order to request the cost of the function from the server station. Such is the case here with the reflection function "flip".

There is thus obtained, at the end of step S810 In FIG. 8, the cost c associated with the function f which it is wished to undo.

Next, a reading step S811 enables the index j to be read of the last coin received, and a test step S812 checks whether the number of coins received i−j is very different from the cost C of the function to be undone.

In practice, the following inequality is verified at the test step S812:

$$i-j<<c$$

where c is the cost associated with the function f, i is the index of the current coin, and j is the index of the last coin received by the client station U, If the reimbursement included in the response is not sufficient, the procedure for processing this response is interrupted and the anomaly is indicated to the user at the information step S815.

Otherwise a storage step S813 enables the new index i to be stored as the index j of the last coin received.

If at the end of the test step S809, the client station $U_A$ having received the reimbursement is not the client station $U_P$ having paid for and required the execution of the function, the storage step S813 can be directly implemented.

Alternatively, the verification steps S810 to S812 can also be Implemented by that client station $U_A$.

An adding step S814 then makes it possible to store the taken coin $W_i$ associated with its index i in an electronic purse of the client station U.

Periodically, each client station U can retransmit to the banking organization the values $W_i$ associated with each index i, stored in the electronic purse in order to recover the monetary value.

Figure 4:
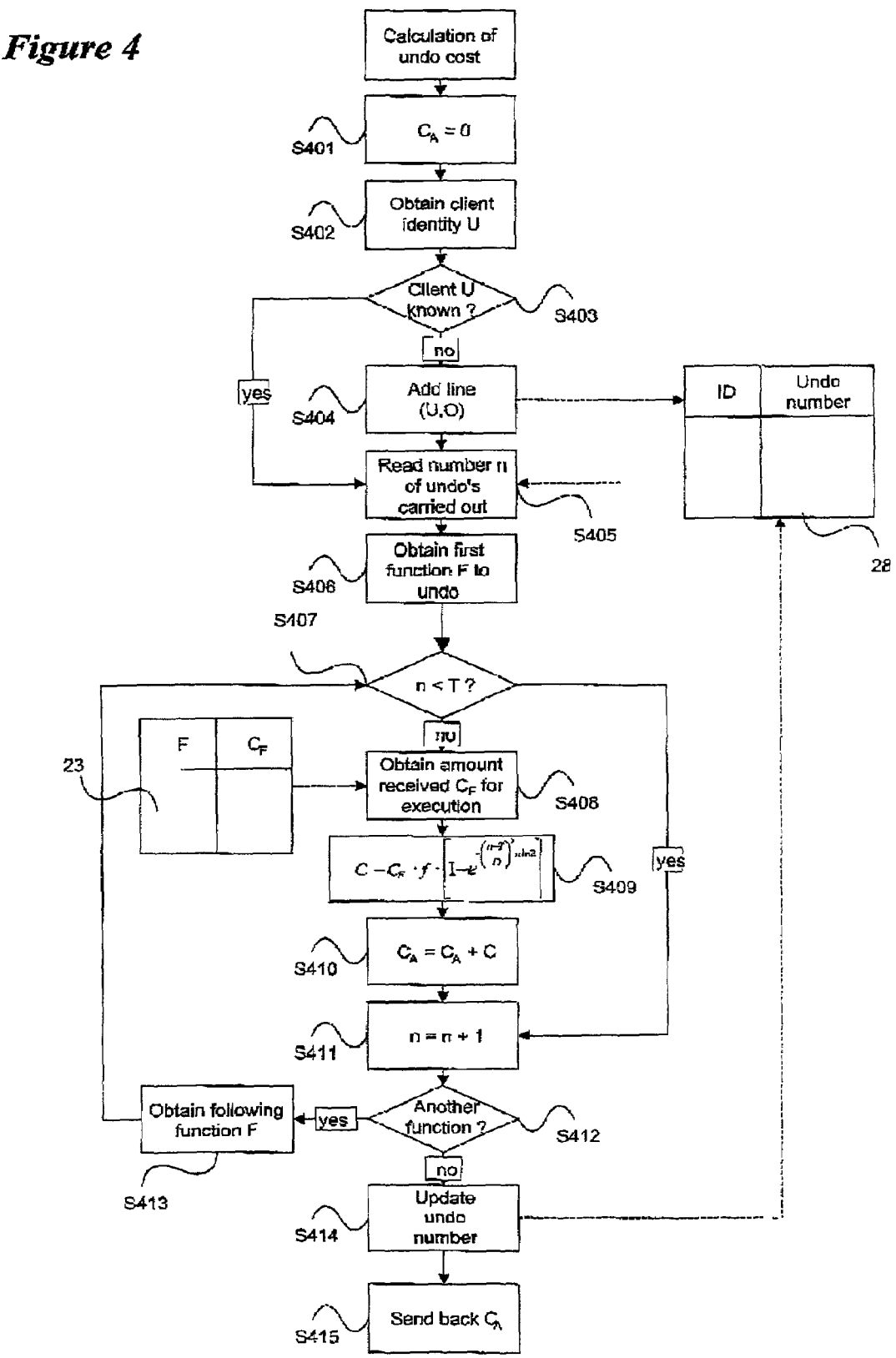
FIG. 4 is an algorithm detailing the procedure for calculating an undo cost used in FIG. 3.

Alternatively, at the adding step S814, a pre-paid card or a PC-card, such as disclosed in FIGS. 4 and 8 of the U.S. Pat. No. 5,937,395, can be used as an electronic purse of the client station U.

Figure 10:
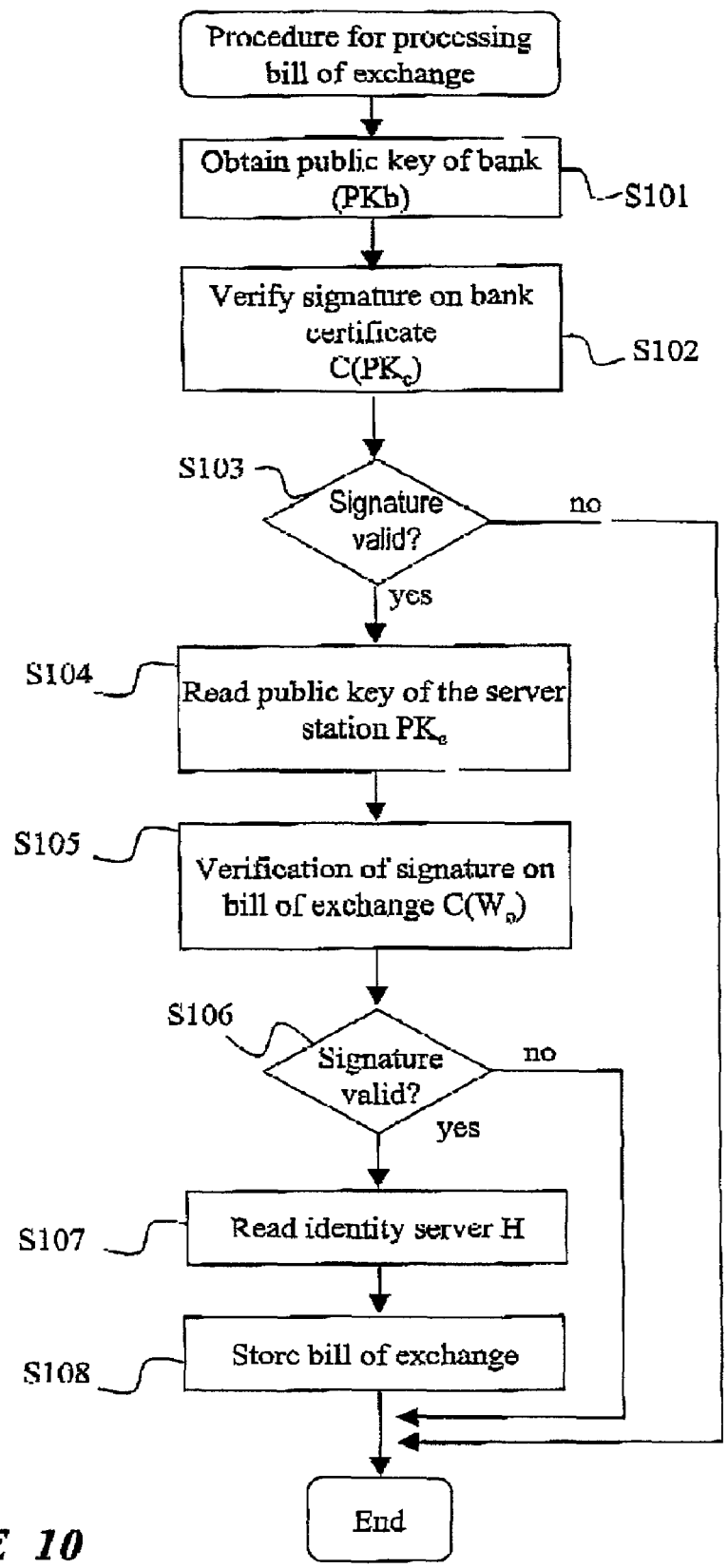
FIG. 10 is an algorithm illustrating a procedure for processing a bill of exchange used on a client station.

A description will now be given, with reference to FIG. 10, of the procedure for processing a bill of exchange received by a client station U on reception of a first reimbursement sent by the server station H.

After reception of this bill of exchange, an obtaining step S101 enables the client station U to obtain from a certification organization the public key of the bank $PK_b$ corresponding to the signature procedure used by the bank.

As described previously, a step S102 of verging the bank certificate $C(PK_e)$ can be implemented using the bank public key $PK_b$ in order to verify the signature.

At the end of a test step S103, if this signature is not valid, the procedure is interrupted.

Otherwise a reading step S104 is implemented in order to read the public key of the server station $PK_e$. In a step S105 this public key $PK_e$ makes it possible to verify the signature of the bill of exchange $C(W_o)$ received by the client station.

At the end of a test step S106, if this signature is not valid, the procedure is interrupted.

Otherwise a reading step S107 is implemented in order to know the identity of the server station H.

A storage step S108 then enables the bill of exchange to be stored in the bill of exchange table 14 of the client station U.

In practice, each server station identifier H is stored in association with the certificate of authenticity or bill of exchange $C(W_0)$, and more specifically with the value of the root coin $W_0$.

This bill of exchange thus enables the client station U to authenticate the coins received from the server station H and to validate the reimbursement sum S received.

Once this step has been executed, the reimbursement is considered to be accomplished.

By virtue of this generation of electronic money on the server station H, the latter does not send the client its own coins, which cannot be implemented reliably, but on the contrary uses a separate set of electronic coins as described previously.

The reimbursement mechanism described in this embodiment is implemented in a manner symmetrical with the mechanism implemented for remunerating the function executed on the server station.

Naturally, many modifications can be made to the example description described above without departing from the scope of the invention.

Thus, in the embodiment described above, an undo cost is borne both by the client station $U_A$ having required the undoing of the function and by the client station $U_P$ having required the execution of the function earlier.

Naturally, the undo cost could be charged only to the client station $U_A$ having required the undoing of the function.

The server station could also propose to re-do the undone functions. In this case, the cost of executing a function again could be equal either:
- to the amount reimbursed at the time of the undoing of the function;
- to the initial cost of execution of the function; or
- to a different cost, between the amount reimbursed at the time of the undoing and the initial cost of execution such that a new execution of an undone function would cost less than the initial execution of the function. This could be justified where the server station has kept in memory the result of the execution of the function after being undone.

The invention claimed is:

1. A method of undoing execution of a function requested by a first client station on a computer object stored on a server station of a communication network, comprising the following steps:
   receiving, from a client station, a request to undo execution of the function on the computer object, the execution of the function being an operation to manipulate the object from an earlier state of the object to a manipulated state of the object;
   obtaining, on said server station, the earlier state of the manipulated object;
   generating electronic money on the server station, associated with the first client station;
   sending a response to the first client station via the communication network, the response comprising a sum of said electronic money comprising at least one electronic money coin, less than or equal to an execution cost received by the server station for the execution of said function; and
   calculating an undo cost associated with the received undo request, wherein the sum of electronic money included in the response to the first client station is calculated after deduction of the undo cost,
   wherein the undo cost is zero if the number of requests for executions of undone functions sent by the client station is less than a predetermined threshold value.

2. The method according to claim 1, wherein the request to undo the execution of the function is sent by a second client station of the communication network, the undo request of the second client station comprising a sum of electronic money, the method further comprising:
   sending a second response to the second client station via the communication network, the second response comprising a sum of electronic money less than or equal to said sum of electronic money included in the undo request of the second client station.

3. The method according to claim 2, further comprising a step of generating the sum of electronic money on the server station associated with the second client station.

4. The method according to claim 2, further comprising a step of calculating a second undo cost associated with the undo request received from the second client station, wherein in the step of sending the second response, the sum of electronic money included in the second response is calculated by deducting the second undo cost from the sum of electronic money included in the undo request of the second client station.

5. The method according to claim 1, wherein at said obtaining step, an opposite function, which is the reverse of the executed function, is executed.

6. The method according to claim 1, wherein the method is further implemented on a list of functions executed subsequently to the function to be undone.

7. A server station in a communication network, comprising means adapted to implement the method of undoing a function according to claim 1.

8. A communication network, comprising means adapted to implement the method of undoing a function according to claim 1.

9. The method according to claim 1, wherein the number of undo requests sent by the client station is stored in a table.

10. The method according to claim 1, wherein at said generating step, the server station generates a chain of coins for the client station.

11. A device for undoing execution of a function requested by a first client station on a computer object stored on a server station of a communication network, comprising:
    receiving means for receiving, from a client station, a request to undo execution of the function on the computer object, the execution of the function being an operation to manipulate the object from an earlier state of the object to a manipulated state of the object;
    obtaining means for obtaining, on said server station, the earlier state of the manipulated object;
    generating means for generating a sum of electronic money on the server station, associated with the first client station;
    sending means for sending a response to the first client station via the communication network, the response comprising a sum of said electronic money comprising at least one electronic money coin, less than or equal to an execution cost received by the server station for the execution of said function; and calculating means for calculating an undo cost associated with the received undo request, wherein the sum of electronic money included in the response to the first client station is calculated after deduction of the undo cost, wherein the undo cost is zero if the number of requests for executions of undone functions sent by the client station is less than a predetermined threshold value.

12. The device according to claim 11, wherein said sending means is adapted to send a second response to a second client station via the communication network, the second response comprising a sum of electronic money less than or equal to a sum of electronic money included in a request to undo the execution of the function sent out by the second client station.

13. The device according to claim 11, characterized in that it is incorporated in:

a microprocessor;

a read only memory adapted to store a program for remote undoing of functions; and a random access memory comprising registers adapted to store variables modified during the execution of said program.

14. A communication network, comprising a device according to claim 1 for undoing an operation.

15. A method of undoing execution of a function requested by a first client station on a computer object stored on a server station of a communication network, comprising the following steps:

receiving, from a client station, a request to undo execution of the function on the computer object, the execution of the function being an operation to manipulate the object from an earlier state of the object to a manipulated state of the object;

obtaining, on said server station, the earlier state of the manipulated object;

generating electronic money on the server station, associated with the first client station;

sending a response to the first client station via the communication network, the response comprising a sum of said electronic money comprising at least one electronic money coin, less than or equal to an execution cost received by the server station for the execution of said function; and calculating an undo cost associated with the received undo request, wherein the sum of electronic money included in the response to the first client station is calculated after deduction of the undo cost, wherein the undo cost is increased with each new undo request if the number of undo requests sent by the client station is higher than a predetermined threshold.

16. The method according to claim 15, wherein at said obtaining step, an opposite function, which is the reverse of the executed function, is executed.

17. The method according to claim 15, wherein the method is further implemented on a list of functions executed subsequently to the function to be undone.

18. The method according to claim 15, wherein the number of undo requests sent by the client station is stored in a table.

19. The method according to claim 15, wherein at said generating step, the server station generates a chain of coins for the client station.

20. A device for undoing execution of a function requested by a first client station on a computer object stored on a server station of a communication network, comprising:

receiving means for receiving, from a client station, a request to undo execution of the function on the computer object, the execution of the function being an operation to manipulate the object from an earlier state of the object to a manipulated state of the object;

obtaining means for obtaining, on said server station, the earlier state of the manipulated object;

generating means for generating a sum of electronic money on the server station, associated with the first client station;

sending means for sending a response to the first client station via the communication network, the response comprising a sum of said electronic money comprising at least one electronic money coin, less than or equal to an execution cost received by the server station for the execution of said function; and calculating means for calculating an undo cost associated with the received undo request, wherein the sum of electronic money included in the response to the first client station is calculated after deduction of the undo cost, wherein the undo cost is increased with each new undo request if the number of undo requests sent by the client station is higher than a predetermined threshold.

* * * * *